United States Patent [19]

Hirashima

[11] Patent Number: 4,745,476
[45] Date of Patent: May 17, 1988

[54] TELEVISION SOUND SIGNAL PROCESSING APPARATUS

[75] Inventor: Masayoshi Hirashima, Ibaraki, Japan

[73] Assignee: Matsushita Electric Industrial Co., Ltd., Osaka, Japan

[21] Appl. No.: 701,284

[22] Filed: Feb. 12, 1985

[30] Foreign Application Priority Data

Feb. 15, 1984 [JP] Japan .................................. 59-26334
Feb. 15, 1984 [JP] Japan .................................. 59-26337

[51] Int. Cl.$^4$ ...................... H04N 7/087; H04N 7/093
[52] U.S. Cl. ..................................... 358/145; 358/143
[58] Field of Search ................. 358/143, 144, 12, 145, 358/142; 375/28

[56] References Cited

U.S. PATENT DOCUMENTS

4,541,101  9/1985  Potage .................................. 375/28

Primary Examiner—James J. Groody
Assistant Examiner—Michael D. Parker
Attorney, Agent, or Firm—Wenderoth, Lind & Ponack

[57] ABSTRACT

A television sound signal processing apparatus receives a digitized delta-encoded sound signal superposed in a horizontal blanking period and a digital signal showing the standard value of the sound signal superposed in a vertical blanking period, and then compares the reference signal of this field with that of one field before, and, when the difference is greater than a predetermined value, employs the decoded value of the delta encoded signal immediately before that reference signal as the standard value for the delta decoding of the sound signal.

5 Claims, 9 Drawing Sheets

TELEVISION SOUND SIGNAL PROCESSING APPARATUS

BACKGROUND OF THE INVENTION

1. Field of the Invention

This invention relates to an apparatus of receiving and decoding signals in an apparatus for coding and transmitting video and sound signals in a CATV system, pay TV system or the like, and more particularly to the decoding of sourd signals.

2. Description of the Prior Art

In a pay TV system or the like, video and sound signals are transmitted by coding so as not to be accessed by nonsubscribers, and they are decoded by subscribers, so that normal picture and sound may be reproduced. Regarding this video and sound coding means, various methods had been proposed so far, but they have had their own problems.

For example, the method of always inverting black and white colors of the video signal only, the method of compressing the synchronizing signal, and the method of inverting the synchronizing signal were easy to decode, and the signals were easily accessed illegally. The method of eliminating the synchronizing signal was unstable in the picture because the jitter of the reproduction synchronizing signal was left over. The method of eliminating the color burst signal was inaccurate in the phase of the reproduction color burst signal and unstable in reproducing colors.

Or, of the methods of coding sound signals, the method of scrambling a PCM sound signal was broad in the bandwidth when another sound carrier was used and was unsuited to an FM broadcast such as satellite broadcasting system, and its decoding unit was expensive. In the method of transmitting sound by plurality carriers and changing them over randomly, the decoding unit was complicated, and it was difficult to balance the stereo sound reproduction.

Object of the Invention

It is hence an object of this invention to present a television sound signal processing apparatus which is hard to access illegally and excellent in the quality of reproduced sound. It is another object of this invention to present a television sound signal processing apparatus capable of eliminating the accumulation of errors when decoding delta-encoded sound signals.

BRIEF SUMMARY OF THE INVENTION

In the television sound signal processing apparatus of the present invention, a digitized delta-encoded sound signal superposed in the horizontal blanking period of television signal, and a standard digital signal of said sound signal superposed in the vertical blanking period are received, and the reference signal of that field is compared with that of one field before, and, when their difference is greater than a predetermined value, the decoded value of the delta-encoded signal immediately before that reference signal is employed as the standard value for the delta decoding of the sound signal.

Furthermore, the reference signals in the field superposed in the vertical blanking period and the fields immediately before and after it are stored continuously for the portion of two fields, and the standad value of the field indicated in the preceding field and that of the present field received in that field are compared, and when they are different and the standard value of the preceding field is correct, the value immediately before that field is used as the standard value for the decoding of the sound signal of that field.

Moreover, the majority value of reference signals transmitted repeatedly by three or more times (by an odd number) within a same horizontal blanking period of a vertical blanking period is used as the standard value for delta decoding of sound signal of the field.

In the television sound signal processing apparatus of this invention, a sound signal of a television signal is sampled and converted into a form of a multivalue digital signal, and its uncompressed digital signal is sent in a certain period while, in the other period, a digital signal is received for the portion of change expressing the difference from the sample value of the sound signal in one horizontal blanking period before being sent into a horizontal blanking period, and, assuming the value of the uncompressed digital signal to be standard value x and the value of the next compressed digital signal to be $\Delta x$, the value $\Delta x$ of the subsequent compressed digital signal is added to the immediately preceding value to process a signal every time as $x = y + \Delta x$, and an uncompressed digital sound signal is obtained, which is converted to an analog sound signal.

Furthermore, when an uncompressed digital sound signal is sent in the vertical blanking period once in every field, this digital value x is taken as the reference, and the signals are processed every time as $x = y + \Delta x$ in relation to the subsequent compressed digital signal value $\Delta x$ to obtain a digital sound signal in a compressed state, which is converted to an analog sound signal.

DESCRIPTION OF THE PREFERRED EMBODIMENTS

The embodiments of the present invention are described below while referring to the accompanying drawings.

Figure 4:
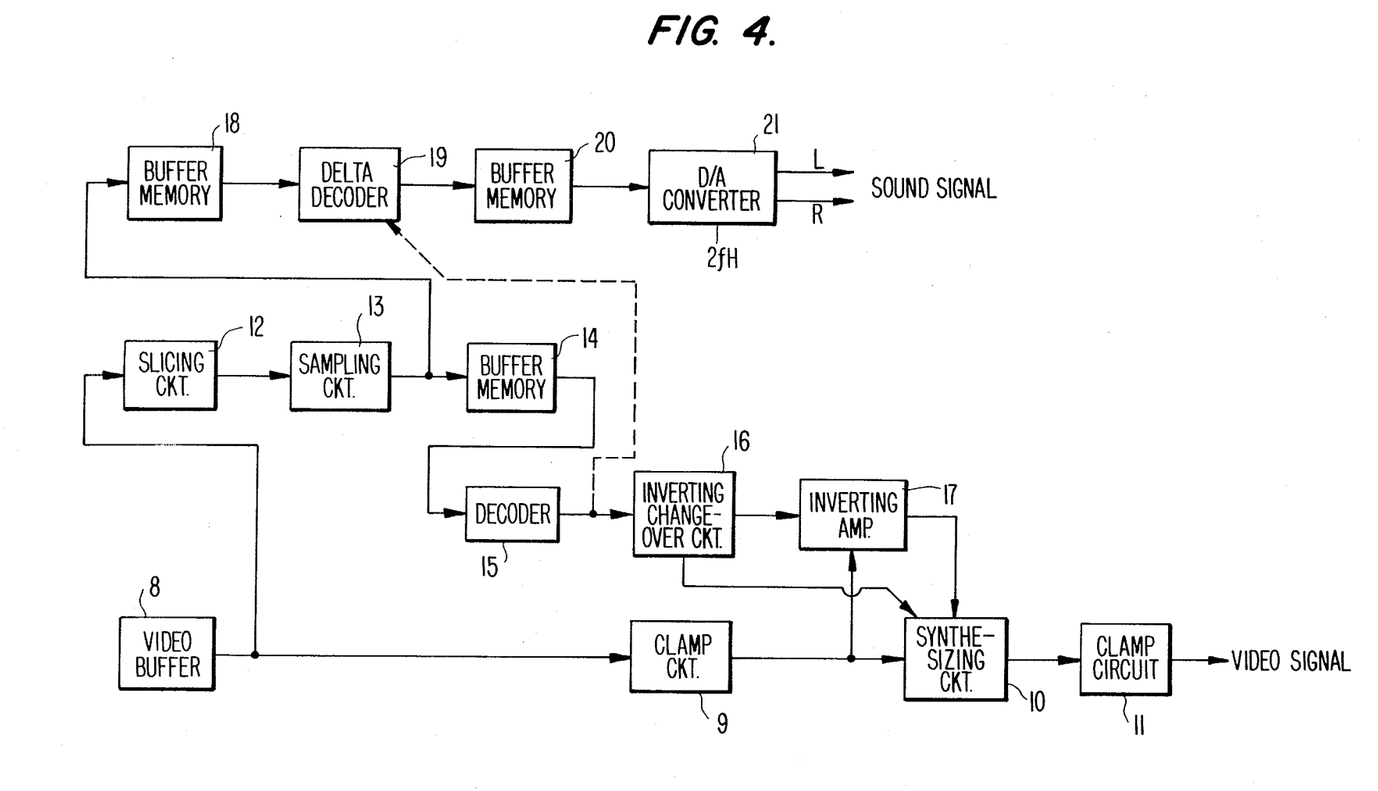
FIG. 4 is a block diagram of a sound signal composite circuit of the same apparatus.

In the embodiments, the whole signal processing and overall operation are accomplished by the whole circuits of FIG. 4. Reproducing of the synchronous signals and generating of the sampling clocks and gate pulses for the signal processing of the circuits of FIG. 4 are accomplished by the circuits of FIG. 5 as shown by the flowchart in FIG. 6. Furthermore, by using these clocks and pulses, reproducing the standard sound signal and the delta decoding of the sound data are accomplished by the circuits of FIG. 8. The circuits of FIGS. 6 and 8 each compose parts of the circuits of FIG. 5 respectively.

Figure 2:
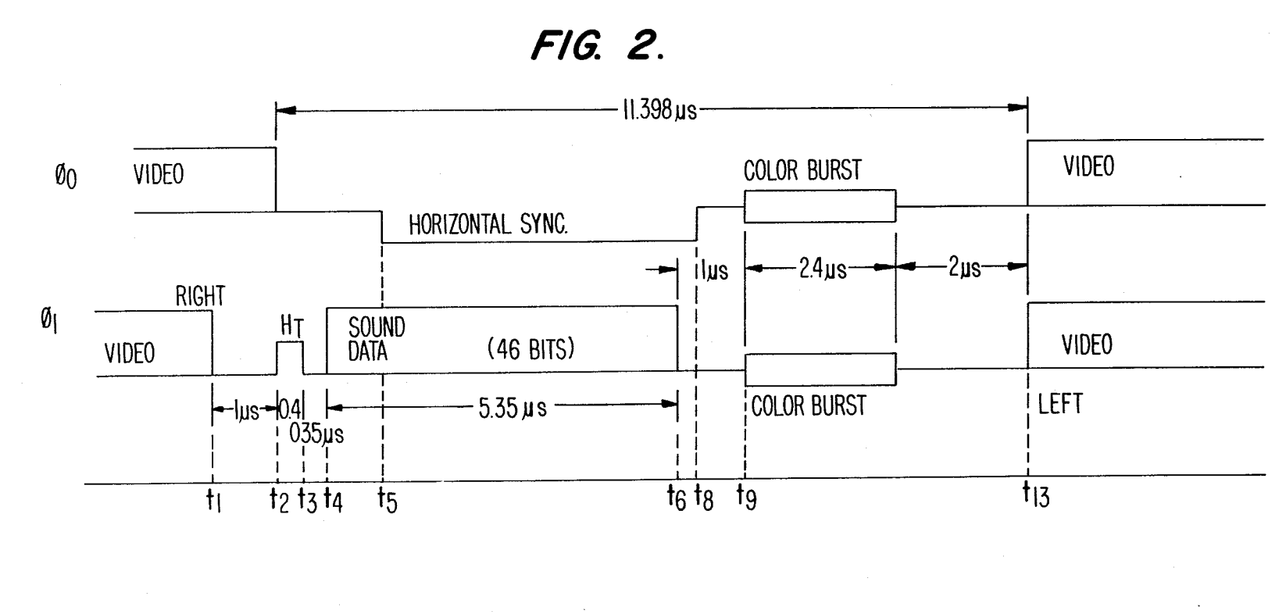
FIG. 2 is a waveform diagram of signals in the horizontal blanking period of the same apparatus.
Figure 3:
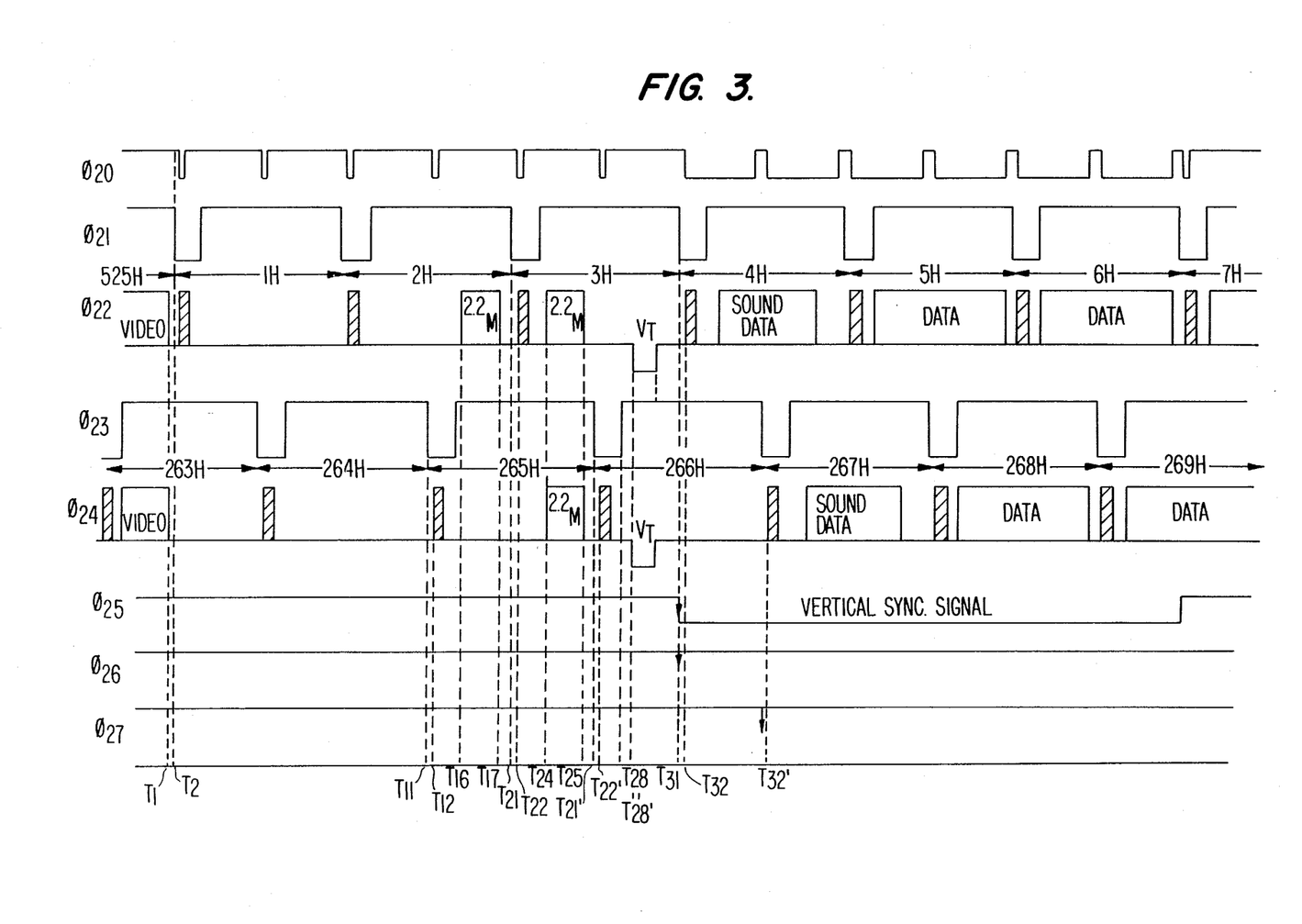
FIG. 3 is a waveform diagram of signals in the vertical blanking period in the same apparatus.
Figure 7:
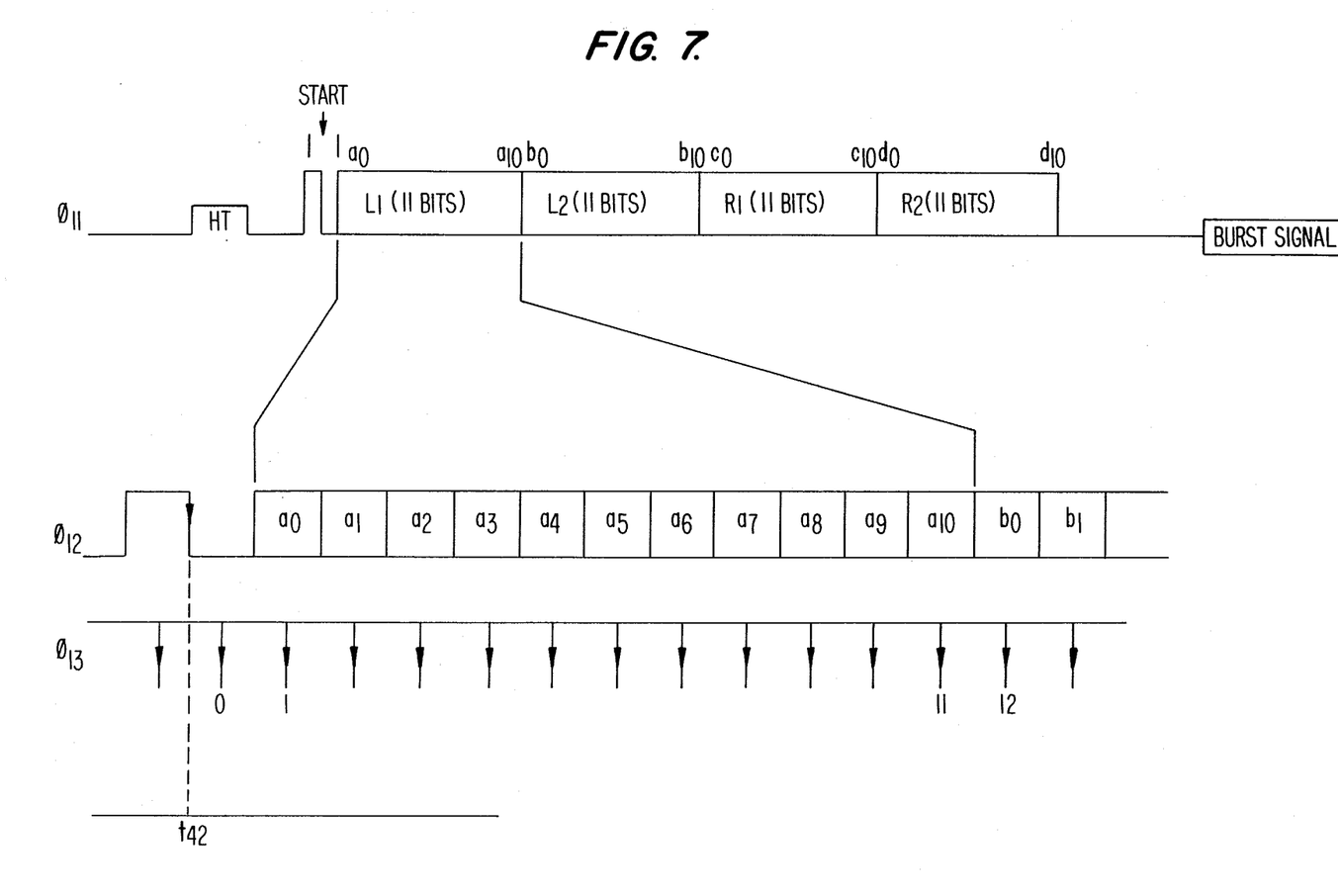
FIG. 7 is a waveform diagram of sound data signals in the same apparatus.
Figure 9:
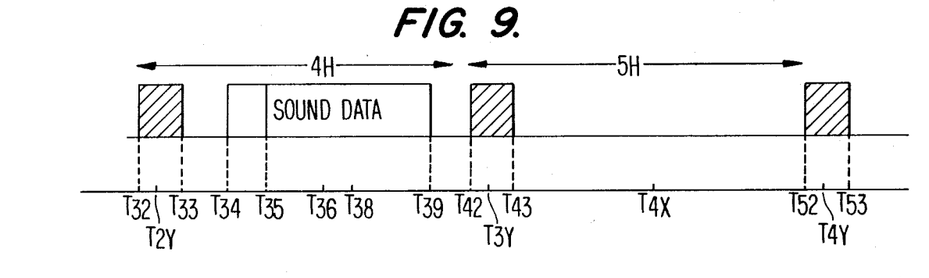
FIG. 9 is a waveform diagram showing the reference sound signal in the same apparatus.
Figure 10:
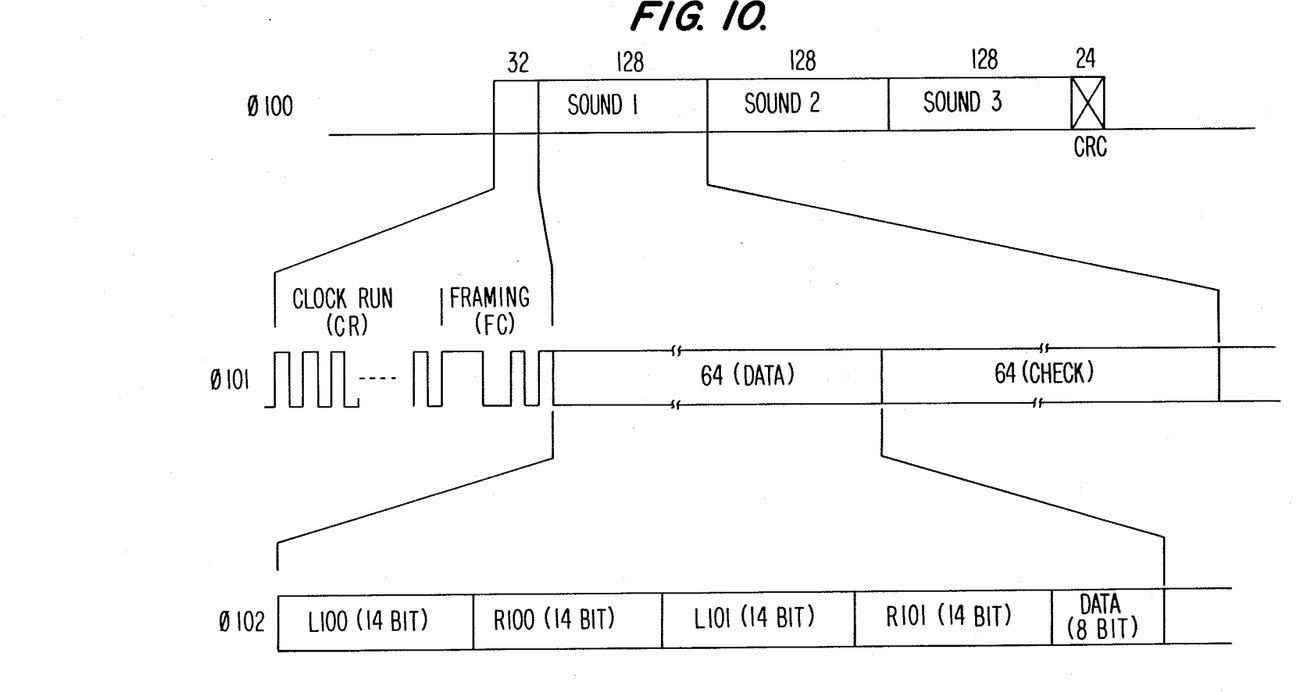
FIG. 10 is a waveform diagram of sound data signals.

Delta encoded sound data is contained in the television signal is as shown in FIG. 2 and the shaded areas in FIG. 3, and the details of the sound data is shown in FIG. 7. Furthermore, delta encoded sound data and the standard sound value signal are shown in FIG. 9, and the details of the standard sound value is shown in FIG. 10.

Figure 11:
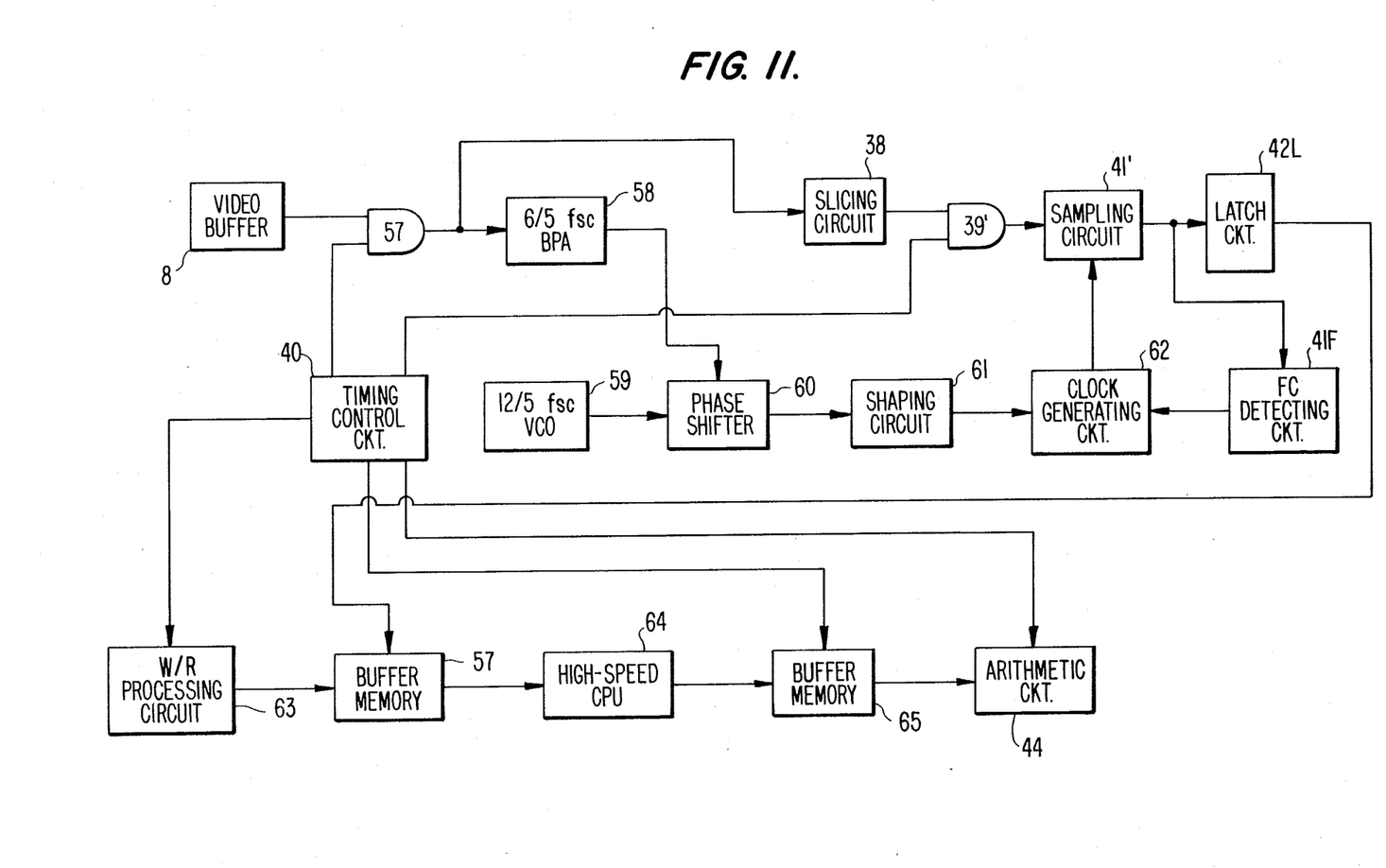
FIG. 11 is a block diagram showing the processing circuit of sound data in the same apparatus.

Furthermore, additional operation of these embodiments, i.e. accurate reproduction of the standard sound value is accomplished by the circuit of FIG. 11.

Figure 1:
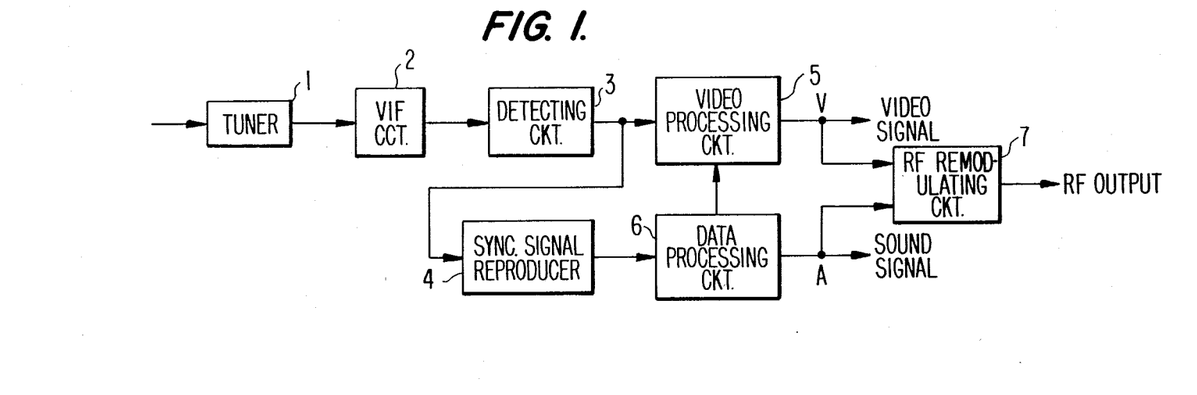
FIG. 1 is a block diagram showing the outline of the television sound signal processing apparatus in one of the embodiments of the present invention.

One of the present embodiments is illustrated in conjunction with FIG. 1, wherein numeral 1 denotes the tuner of a televison receiver; element 2 is a VIF circuit; element 3 is a detecting circuit; element 4 is a circuit to reproduce synchronizing signals, and element 5 is a circuit to invert or not to invert the video signal on the basis of the data processing result of a data processing circuit 6. This data processing circuit 6 is intended to process the data, and convert a digital sound signal into an analog signal, and deliver a discriminating signal (changeover signal) to invert or not to invert the video signal. Numeral 7 is a circuit to form an RF output signal (VHF) using the sound and image normalized as the inputs in an RF remodulation circuit.

FIG. 3 shows the signals in the former part of the vertical blanking period, wherein $\phi_{20}$ is the composite synchronizing signal of the television signal, $\phi_{21}$ is the horizontal blanking signal in the first field, $\phi_{22}$ is the output signal of the detecting circuit 3 in the first field, $\phi_{23}$ is the horizontal signal in the second field, $\phi_{24}$ is the output signal of the detecting circuit 3, $\phi_{25}$ is the vertical synchronizing signal, $\phi_{26}$ is the signal which is produced at the front edge of the horizontal blanking signal of 4H, and $\phi_{27}$ is the signal which is produced at the front edge of the horizontal blanking signal of 267H.

The output of the detecting circuit 3 lacks a horizontal synchronizing signal and a vertical synchronizing signal as shown in FIG. 2 $\phi_1$, FIG. 3 $\phi_{22}$ and $\phi_{24}$, and vertical trigger signal $V_T$ and horizontal trigger signal $H_T$ are inserted instead. The shaded areas $\phi_{22}$ and $\phi_{24}$ in FIG. 3 are in same composition as $t_2$ to $t_6$ in FIG. 2 $\phi_1$, i.e.—the data of $t_2$ to $t_6$ transmitted at the shaded areas of $\phi_{22}$ and $\phi_{23}$. The polarity of the video signal is repeatedly inverted and noninverted at random intervals in the horizontal scanning line unit or screen unit. When the polarity of color burst signal is changed, however, hue deviation or other problems may occur. Therefore, the color burst signal is not inverted.

Hereunder the reproduction of the synchronizing signal is described. First, the outline of the operation is mentioned by referring to FIG. 5. If a synchronous reproduction is to be effected, the output of a buffer 8 is sliced in a slicing circuit 12 and shaped into a binary signal, and is sampled in a sampling circuit 13 to store sound data at every H in a buffer memory 18, while the delta-encoded signal is decoded in a delta decoder 19 as is described below by referring to FIGS. 7–9 and transferred into a buffer memory 20, whose output is D-A converted at a speed of $2 f_H$ by a D/A converter 21, and two outputs for right and left are obtained using the high quality sound of a sampling rate $2 f_H$ and maximum frequency $f_H$ as the output of D/A converter 21.

On the other hand, the data of 5H to 7H, 268H to 270H in FIG. 3 are written into a buffer memory 14, read out, and decoded in a decoder 15, and a signal is provided to control whether or not the video signal is inverted, while a pulse to control the inverting period is formed in an inverting changeover circuit 16 and supplied to a synthesizing circuit 10. The output of a clamp circuit 9 is inverted in an inverting amplifier 17, whose output is also supplied to the synthesizing circuit 10, and the output of the synthesizing circuit 10 is changed over whether the output of clamp circuit 9 or the output of the inverting amplifier 17 is supplied, by the output of the inverting changeover circuit 16. The output of the inverting changeover circuit 16 is also supplied to the inverting amplifier 17, and the output of the inverting amplifier 17 is suppressed when inversion is not required, and the crosstalk is lessened in the synthesizing circuit 10. When the output of the synthesizing circuit 10 is clamped in a clamp circuit 11, an ordinary video signal is obtained.

Figure 5:
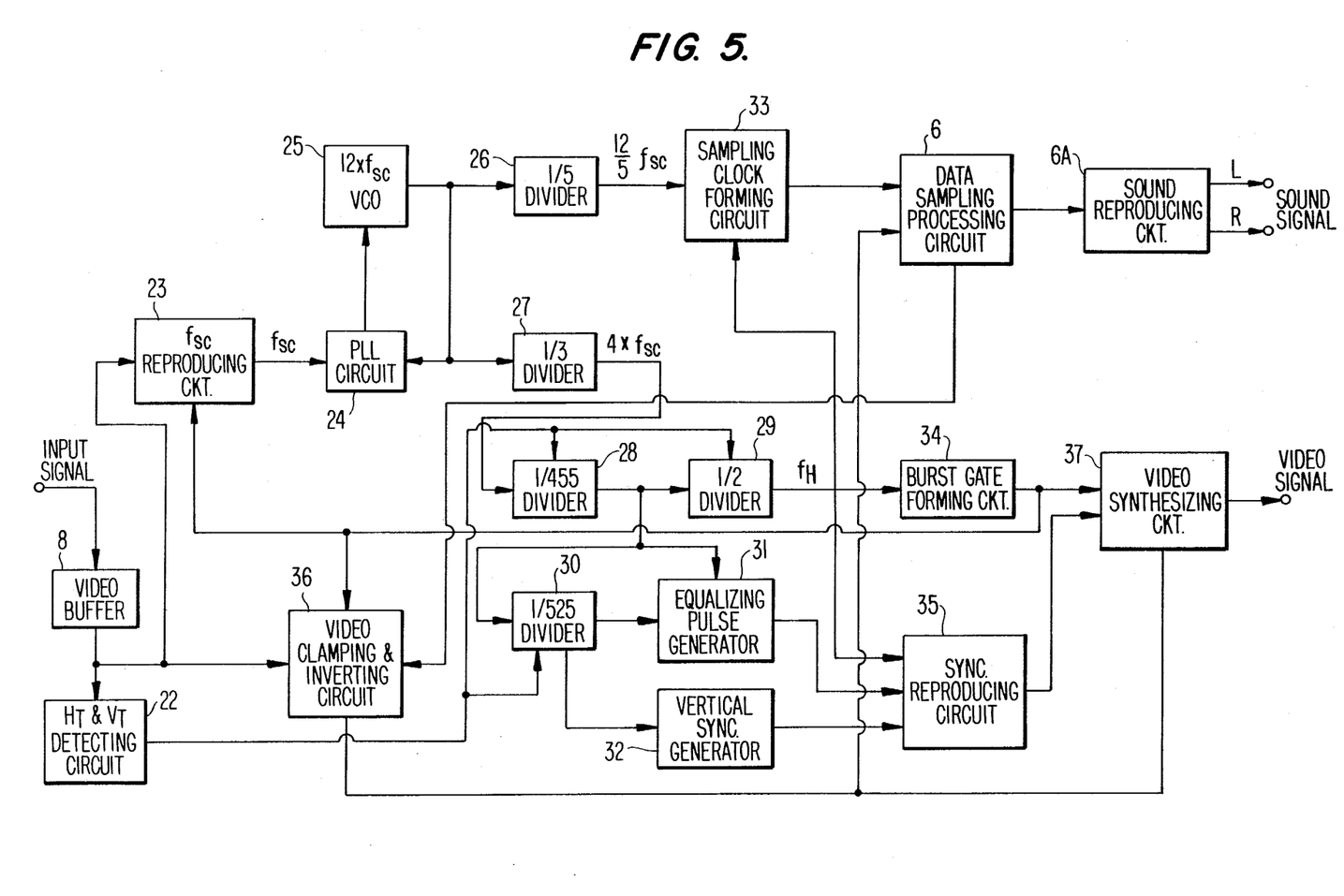
FIG. 5 is a block diagram representing the synchronous reproducing circuit of the same apparatus.
Figure 6:
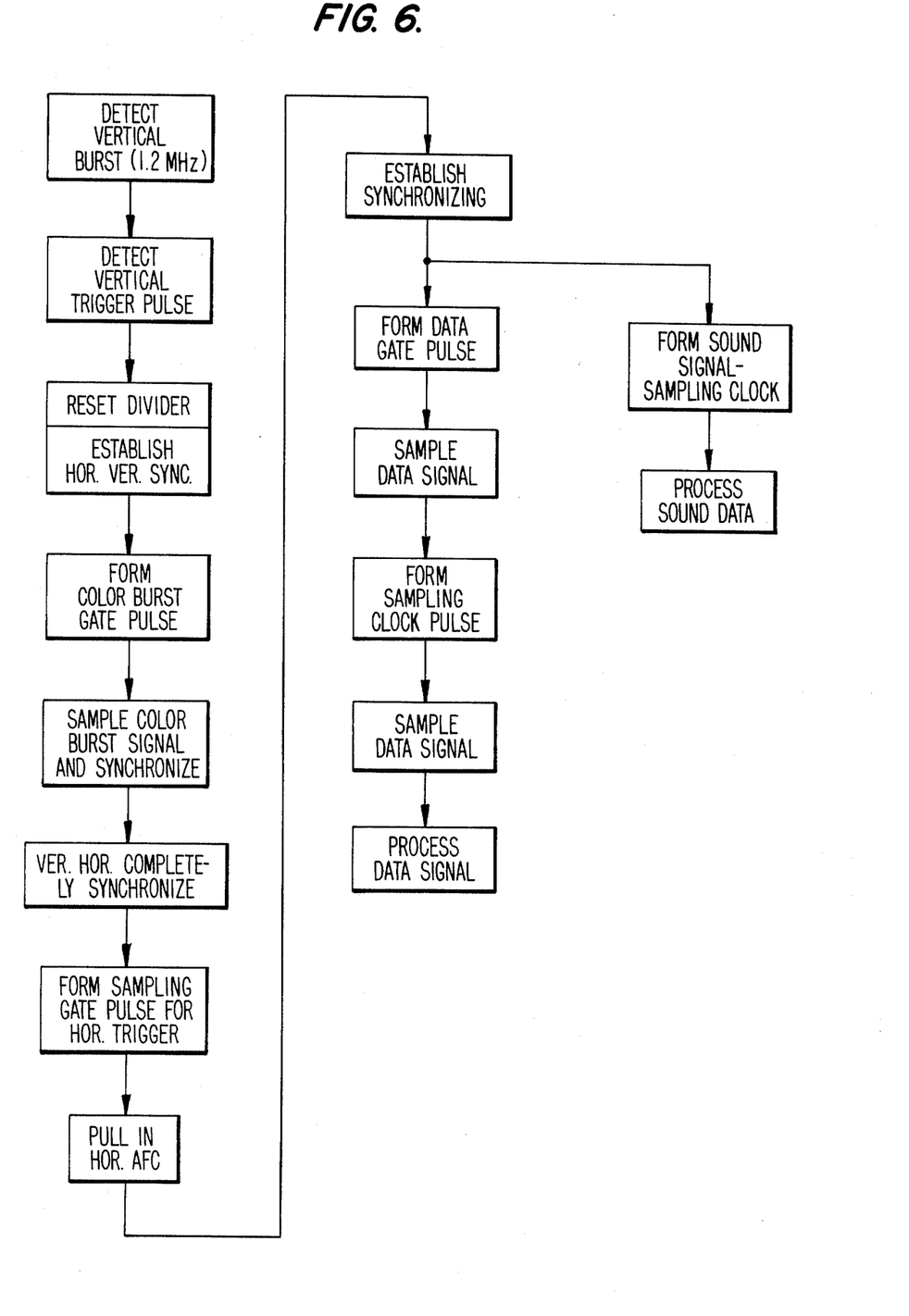
FIG. 6 is a flowchart showing the synchronous reproducing procedure of the circuit shown in FIG. 5.

The synchronous reproduction is described in details below in conjunction with FIG. 5. The procedures of synchronous reproduction and data processing are shown in FIG. 6. Numeral 22 in FIG. 5 is a detecting circuit for detecting vertical trigger signal $V_T$ and horizontal trigger signal $H_T$; element 23 is a reproducing circuit for reproducing color subcarrier $f_{sc}$; element 24 is a circuit for effecting a PLL (phase locked loop) of $12f_{sc}$ and $f_{sc}$ of a VCO (voltage controlled oscillator); element 26 is a 1/5 divider; element 27 is a $\frac{1}{3}$ divider, and element 28 is a 1/455 divider of the output of the $\frac{1}{3}$ divider 27, that is, $4f_{sc}$, whose output is $2f_H$. Numeral 29 is a $\frac{1}{2}$ divider, whose output is $f_H$, and element 30 is a 1/525 divider of $2f_H$, whose output is about 60 Hz. Numeral 31 is an equalizing pulse generator, and element 32 is a generator of the vertical synchronizing signal. Numerals 28 through 32 are known circuits commonly used as the synchronizing board for synchronizing TV signals. Numeral 23 is a sampling clock forming circuit, and when the data transmission rate is $6/5f_{sc}$, a sampling clock is formed by using $12/5f_{sc}$ of the output of the 1/5 divider 26. The output of the sampling clock forming circuit 33 is supplied to a data sampling processing circuit 6 to be sampled, and the data is processed. Numeral 6A is a sound reproducing circuit for forming analog sound. Numeral 34 is a burst gate forming circuit for forming a burst gate from the output of the $\frac{1}{2}$ divider 29. In a synchronous reproducing circuit 35, cmposite synchronizing signals are formed from the outputs of dividers 29, 31, 32, and the composite synchronizing signal output of this circuit 35 and the output of a video clamping and inverting circuit 36 are synthesized in a video synthesizing circuit 37, and a video signal is formed. The video clamping and inverting circuit 36 clamps the video signal and inverts the video signal for a required period according to the output of the data sampling processing circuit 6.

Thereafter, in the procedure as shown in FIG. 6, the synchronizing signal is established, and the data is processed, and the sound is processed.

Parameters of the sound signal and information data are shown in Tables 1 and 2, in which the sound signals in the horizontal blanking period are indicated.

FIG. 7 shows the details of the sound data $T_2$ to $T_6$ to $\phi_1$ of FIG. 2.

As evident from Table 1 and FIG. 7, the sound data which is transmitted from the transmitter in every horizontal blanking period is as shown in FIG. 2. $\phi_1$ is comprised of a total 46 bits comprising 44 bits for two samples of each of the right and left sound signal respectively and 2 bits for phase synchronizing, i.e. 1, 0 provided before it. In FIG. 7, based on the fall of the first bit of $\phi_{12}$, 45 clocks are generated by timing control circuit 40 thereafter from 0 to 44. Further, 440 clocks for the 440 bits of the data as shown in FIG. 9 $T_{34}$ to $T_{39}$ (also as shown in FIG. 10) are generated. When the phase of $\phi_{13}$ is adjusted so that the 1/5 divider 26 may be reset at the first bit of $\phi_{12}$, the time for $\phi_{12}$ settles within the portion of one cycle of $12f_{sc}$, that is, about 23 ns ($\pm 11.5$ ns).

Figure 8:
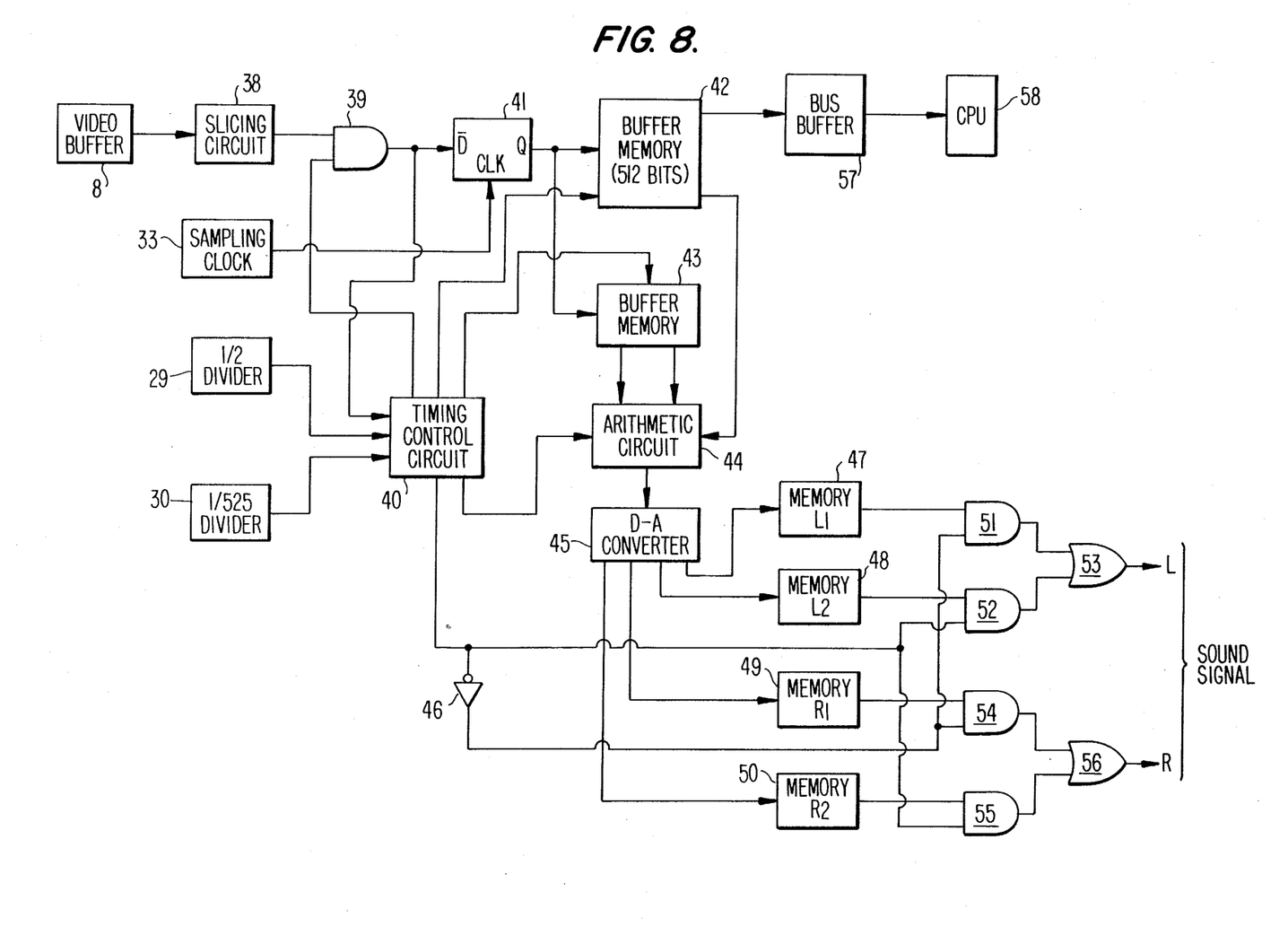
FIG. 8 is a block diagram illustrating the processing signal of the same sound data signals.

An example of sampling and sound signal processing circuit is shown in FIG. 8. The output of the buffer 8 is sliced in a slicing circuit 38, and a binary waveform as shown in FIG. 7 $\phi_{12}$ is obtained. On the other hand, in a timing control circuit 40, gate pulses containing a portion of sound signal ($t_2$ to $t_6$ in FIG. 2) are generated by using the output signal of the ½ divider 29 and 1/525 divider 30.

As the output signal of the ½ divider 29 is $f_H$ signal which is synchronized to the horizontal trigger signal $H_T$ and the output signal of the 1/525 divider 30 is $f_V$ signal which is synchronized to the vertical trigger signal $V_T$, the gate pulses are generated by using the pulse generating circuits, for example, multivibrators or counters, which are triggered by the outputs of the dividers 29 and 30 in the timing control circuit 40. The gate pulses are applied to an AND gate 39, and only the sound signals and data are extracted and supplied to D terminal of D flip-flop 41. When the flip-flop 41 is clocked by FIG. 7 $\phi_{13}$ and 440 clocks, the data can be sampled. The fall of $t_{42}$ is detected by the output of the AND gate 39, and clocks 0 and 44 and 440 clocks are generated as stated above.

The buffer memory 43 is controlled by control signal generated in the timing control circuit 40 by using the $f_{sc}$, $f_H$ and $f_V$ signal so that the output of the D flip-flop 41 may be fed to the buffer memory 43 only for the portion of 44 bits of 1 to 44. A control signal for writing into the sound data is generated in the timing control circuit 40 by using of the $f_{sc}$, $f_H$ and $f_V$ signal and sent from the timing control circuit 40 to the buffer memory 42 so that data for the portion of 440 bits may be stored. This data of 440 bits is the sound or information data as shown in Table 2, and is transmitted in $T_{34}$ to $T_{39}$ as shown in FIG. 9. This data is picked-up by the D flip-flop 41 by using the 440 clocks and is supplied to the buffer memory 42. When the sound data in FIG. 3 is received in the VBL, uncompressed L and R digital values (for example, 14 bits each) thereof are stored in the buffer memory 42, and are transmitted to an arithmetic circuit 44 a short time later by addressing the buffer memory 42 of the addesses of the sound data. Said 14 bits will be corrected if there is an error of 1 to 2 bits or more.

In FIG. 9, if there are 2×14 bits (including an error correction code) in $T_{34}$ to $T_{35}$, the error should be corrected from $T_{35}$ to $T_{42}$. This is effected in a circuit attached to the buffer memory 42 by using the parity check method.

On the other hand, the data of $T_{32}$ to $T_{33}$ is stored in the buffer memory 43 somewhat later (for example, 1 $\mu$s) than $T_{33}$. The data of $T_{32}$ to $T_{33}$ represents the delta-encoded sound signal which is shown in FIG. 7. Supposing this time to be $T_{33}+\Delta T$, the data of $a_0$ to $a_{10}$ and the previous data, the previous data is the uncompressed L and R digital values (14 bits each) which was received in previous VBL and stored in the buffer memory as described above, are arithmetically operated by the arithmetic circuit 44 for delta decoding under the control signal from the timing control circuit 40 within, for example, 1 $\mu$s, from $T_{33}+\Delta T$. When the operation and error correction are done in hard logic, both operations can be processed within 1 $\mu$s each. The result of this arithmetic operation is D-A converted by the D-A converter 45 and stored in memory $L_1$ of 47. Furthermore, the data of $c_0$ to $c_{10}$ is compared with the previous data, and the result is D-A converted and stored in memory $R_1$ of 49. Numerals 47 through 50 are analog memories.

It is sufficient when the above operations be done within about ½H, and when the error correction circuit and arithmetic operation circuit are composed in hard logic as mentioned above, 11 bits of memories $L_1$, $R_1$ may be cmpletely processed within several to ten microseconds. The time of delivering the data $L_1$, $R_1$ of $T_{3x}$ in FIG. 9 is nearly in the middle of 1H (common to each H). Therefore, there is an allowance of about 26 $\mu$s between $T_{33}$ and $T_{3x}$, and the safe margin is sufficient if the above processing time is assumed to be about 10 $\mu$s. From $T_{3x}$, processing of $b_0$ to $b_{10}$, $d_{10}$ to $d_{10}$ is effected. They are delivered from memory $L_2$ of 48 and memory $R_2$ of 50, at $T_{3y}$ in ½H after $T_{3x}$.

The timing control circuit 40 is controlled by the $f_H$ signal from the ½ divider 29 and the $f_V$ signal from the 1/525 divider 30, and provides the output having low and high level alternatively changing the level in every ½ $f_H$, i.e. low level in $T_{3x}$ to $T_{3y}$ and $T_{4x}$ to $T_{4y}$, high level in $T_{2y}$ to $T_{3x}$ and $T_{3y}$ to $T_{4x}$.

The output of each memory of 47 to 50 is alternately delivered from AND gates 51 to 55 or OR gates 53, 56. That is, in $T_{3x}$ to $T_{3y}$, since the output of timing control circuit 40 is at low level, the output of the inverter 46 becomes high level, and AND gates 51, 54 are made to conduct, so that the contents of memories 47, 49 may be taken out as L and R sounds, respectively. In $T_{3y}$ to $T_{4x}$, since the output of timing control circuit 40 is at high level, the AND gates 52, 55 are made to conduct, and the outputs of memories 48, 50 becomes L and R outputs. The operation is the same for other Hs.

The sound data received at time $T_{34}$ to $T_{35}$ in FIG. 9 is processed for error correction by buffer memory 42 until $T_{39}$, and is fed to an arithmetic operation circuit 44 at $T_{42}$, and are directly D-A converted. Thus, the converted data sent within $T_{34}$ to $T_{35}$ in FIG. 9 is delivered from D-A converter 45 to memory 47, 49 to reproduce the sound for duration of $T_{4x}$ to $T_{4y}$. At this time, 11 bits each of $L_1$, $R_1$ of $T_{42}$ to $T_{43}$ are not used because the uncompressed data sent in $T_{34}$ to $T_{35}$ is used for the first sample of the sound in every field. Thereafter, taking this value of the first sample as the starting sound value for each field, only the changed value of the sound from the starting sound value is successively added or subtracted to accomplish the delta decoding under the control signal from the timing control circuit 40 as described above. Meanwhile, if the first one bit of 11 bits is treated as a code, the remaining 10 bits are increments of decrements for delta decoding. Therefore, it is possible to follow up the changes of 60 dB. By using processing digital sound signals, the standard value can be transmitted once in every field correctly by adding an error correction code even in a so-called digital encoding of 11 bits, so that the sound signals are sufficiently excellent and resistance to noise.

Numerals 57, 58 in FIG. 8 are parts of signal processing circuit used in a so-called teletext receiver or the like, and 57 is a bus buffer and 58 is a CPU. That data in the VBL after 4H in FIG. 3 is processed in these bus buffer 57 and CPU 58, of which composition is known, being similar to that of a so-called teletext receiver.

An accurate reproduction of the standard value of sound is described below while referring to FIGS. 9 to 11. The actual sound data in FIG. 9 is assumed as shown in FIG. 10. At $\phi_{100}$, the preceding 32 bits are composed of 24 repetitive bits of 1 and 0 of clock run (CR) and 9 bits of framing code. The next 384 bits consist of three sets of sound data of 128 bits each, having the same content, comprising 64 bits of information and 64 bits of check code as in $\phi_{100}$. This takes the form of source BCH (Bose-Chandhuri-Huffman) code, one of well-known error correction codes, and can correct random and burst error within 10 bits. The final 24 bits of $\phi_{100}$ are CRC (Cyclic Redundancy Check) codes, one of well-known error correction codes. The information of 64 bits consists of the portion of two fields each for L and R, $2 \times 2 \times 14 = 56$ bits, and 8 bits of additional data. The 8-bit data may be used as required, and CRC may not be necessarily used.

The flow of signal is explained in FIG. 11. Numeral 57 is an analog gate, and gate pulses comprising $T_{34}$ to $T_{39}$ in 4H in FIG. 9 are generated in the timing control 40, and the output of video buffer 8 is gated. If any data of the same number of bits is wholly superposed, for example, up to 21H in VBL, gate pulses including $T_{34}$ to $T_{39}$ (440 bits) are delivered every H from the timing control circuit 40 from 4H to 21H and 267H to 284H, and are applied to a gate 57. The output of the gate 57 is converted into a binary value in the slicing circuit 38, and is gated by the output of the timing control circuit 40 at AND gate 39′. The AND gate 39′, different from the gate 39 in FIG. 8, is made to conduct if the gate 57 conducts in other periods than the horizontal blanking period. In the horizontal blanking period, the parts except buffer memory 42, bus buffer 57, and CPU 58 in FIG. 8 will operate as stated above. A sampling circuit 41′, different from the 41 in FIG. 8, is a shift register having an S-P converting function.

On the other hand, the output of gate 57 is applied to (Band Pass Amplifier) 58 of $6/5f_{sc}$, and the part of clock run-in in FIG. 10 $\phi_{101}$ appears as a sine wave. This is used to control the phase of the output of VCO 59 of $12/5f_{sc}$. Numeral 60 is a phase shifter, and the phase of the output of VCO 59 is matched with the phase of the output of BPA 58 by the output of BPA 58, that is, the rise or fall of the output of the phase shifter 60 is adjusted to the middle of each bit of received $\phi_{101}$, and after the clock run period, phase information is not received but is held until the clock run of next horizontal scanning period or clock run of next field. Thus, since at least 1H can be sufficiently maintained within a same phase, a clock synchronized with data can be formed in the phase shifter 60. The circuit of phase shifter 60 is an analog one, and its output is shaped into pulses in a shaping circuit 61, and supplied into a clock generating circuit 62. The clock is supplied from the clock generating circuit 62 into the sampling circuit 41′, and when a framing code appears in the output of the sampling circuit 41′, it is detected in FC detecting circuit 41F, and the subsequent 440−32=408 clocks are supplied into the sampling circuit 41′, and 408 bits in 1H are sampled, and supplied into a latch circuit 42L. In the latch circuit 42L, the output of the sampling circuit 41′ is latched by every 8 bits, and is supplied into the buffer memory 57. Data for the portion of two fields is stored in the buffer memory 57.

Writing of data into the buffer memory 57 and reading-out the data from the buffer memory 57 are controlled by W/R processing circuit 63. The contents in the buffer memory 57, that is, the data in the corresponding field (the portion of three times of $L_{100}$, $R_{100}$ in FIG. 10 $\phi_{102}$) of $2 \times 56 \times 3$ bits for the portion of two fields, are compared. Since the same data is stored three times, the majority is determined by comparison, and $L_{101}$, $R_{101}$ are determined. If not determined, the $L_{100}$, $R_{100}$ stored in the previous field are used. The $L_{101}$, $R_{101}$ are held up to the next field.

These processing are done by the high speed CPU 64 or hard logic. The time available for processing is about 40 μs at maximum of $T_{39}$ to $T_{4x}$ in FIG. 9, but is is necessary to finish somewhat before $T_{4x}$.

The output of the CPU 64 is stored in the buffer memory 65, and supplied to the arithmetic operation circuit 44 before $T_{4x}$ to be used as the standard value at the time of $T_{4y}$, and is also D-A converted and stored in memories 47, 49 before $T_{4x}$. Thus, sine the standard values of L and R are obtained once in every field without being compressed, the operation returns to a normal state within one field if a malfunction occurs during delta decoding.

In FIG. 10, incidentally, error correction, three times of majority decision, and forwarding of data in previous field are mentioned to take place simultaneously, but is is the same ir they are done separately. Or, at $\phi_{102}$, only $L_{100}$ and $R_{100}$ may be used and the remaining 28 bits may be used in other data. When effected as in FIG. 10, if $\phi_{102}$ skips in one field, the value in the previous field may be used. In delta decoding system, errors may be accumulated, but in this system, the data returns to the correct value within one field

EFFECT OF THE INVENTION

Thus, this invention presents a processing circuit for delivering sound of high quality containing reproduced image, which is hard to be illegally accessed, in decoding encoded sound signals. It is another advantage that the decoding circuit is suited to LSI and is practical.

TABLE 1

| Item | Numerical value |
| --- | --- |
| Data transmission rate | $\frac{12}{5} = 8,590,908$ Hz |
| Max. frequency component of data (fundamental wave) | 4,295,454 Hz |
| One-bit width of data | Approx. 116.402 nsec |
| Sound data per 1H | 46 bits |
| Right sound data | 22 bits (2 samples) |
| Left sound data | 22 bits (2 samples) |
| Start bit | 2 bits |
| Sound sampling rate | $2f_H \approx 31.468$ kHz |
| Sound max. frequency component | $f_H \approx 15.734$ kHz |
| No. of bits per one sound sample | 11 bits |
| Modulation method of digital sound signal | Delta encoding |
| Initializing period of sound signal | One field |
| Initializing data of sound signal | 16 bits |

TABLE 2

| Item | Numerical value |
| --- | --- |
| Transmission speed of information data | $\frac{6}{5} f_{sc} = 4,295,454$ Hz |
| One-bit width of information data | Approx. 116.4 ns |
| No. of information data pieces per 1H | 440 bits (55 bytes) |
| Information data superposing period (within 1H) | $440 \times 0.1164 \approx 51.22$ μs |
| Bit period | 10101010101010 (2 bytes) |
| Frame period | 11100101 (1 byte) |

What is claimed is:

1. A television sound signal processing apparatus comprising a means to receive a digitized delta-encoded sound signal being superposed in a horizontal blanking period and a digital signal indicating a standard value of said sound signal, said digital signal is superposed in a vertical blanking period of each field, a means to store said received digital signal until a digital signal of a next field is received, a means to compare the digital signal of a current field with that of a previous field, a means to delta-decode the delta-encoded sound signal for reproducing the sound by using the digital signal, and a means to employ a delta-encoded sound signal being received just before said digital signal as the standard value for delta decoding in said means to delta-decode the delta-encoded sound signal when the difference of both of said digital signals being received in said current field and in said previous field is greater than specified.

2. A television sound signal processing apparatus as set forth in claim 1, in which said digital signal comprises digital signals each indicating standard values of sound signals which have been superimposed in a previous field and a current field respectively, and said means to compare compares said digital signals indicating said standard values of said current field with those of said previous field.

3. A television sound signal processing apparatus as set forth in claim 1, in which said digital signal is transmitted and received repeatedly by three times or more in an odd-number within a same horizontal scanning period in the vertical blanking period, and further comprising a means to compare said repeatedly received digital signal with each other for employing majority digital signal as the standard value for delta decoding of the delta-encoded sound signal of the current field.

4. A television sound signal processing apparatus comprising; a means to receive and store delta-encoded signals comprising a digital signal being superposed in a horizontal blanking period for indicating a difference between sampled values of sound signals of a current and a previous horizontal blanking period and an uncompressed digital signal being superposed in a period other than said horizontal blanking period, a means to delta decode to obtain an uncompressed sound signal by processing said signals, assuming a value of the uncompressed digital signal to be a standard value x and a value of the delta-encoded signal to be $\Delta x$, by adding said value $\Delta x$ to a preceding value x as $x = x + \Delta x$, and a means to convert an output uncompressed sound signal of said means to delta-decode to an analog sound signal.

5. A television sound signal processing apparatus as set forth in claim 4, in which said uncompressed digital signal is superimposed in the vertical blanking period in every field.

* * * * *